(12) United States Patent
Kelley et al.

(10) Patent No.: US 10,448,625 B1
(45) Date of Patent: Oct. 22, 2019

(54) DYE COLOR STAINING THE EXTERIOR OF LIVE ANGLING BAIT SPECIES

(71) Applicant: Pautzke Bait Co., Inc., Ellensburg, WA (US)

(72) Inventors: Casey Robert Kelley, Ellensburg, WA (US); Dion Arledge Rivera, Ellensburg, WA (US)

(73) Assignee: Pautzke Bait Co., Inc., Ellensburg, WA (US)

( * ) Notice: Subject to any disclaimer, the term of this patent is extended or adjusted under 35 U.S.C. 154(b) by 0 days.

(21) Appl. No.: 15/961,511

(22) Filed: Apr. 24, 2018

Related U.S. Application Data

(60) Provisional application No. 62/508,203, filed on May 18, 2017.

(51) Int. Cl.
| | | |
|---|---|---|
| *A23K 50/80* | (2016.01) | |
| *A01K 97/04* | (2006.01) | |
| *D06P 3/32* | (2006.01) | |

(52) U.S. Cl.
CPC .............. *A01K 97/045* (2013.01); *D06P 3/32* (2013.01)

(58) Field of Classification Search
CPC ...... A23K 50/80; A23K 20/179; A23K 20/10; A23K 20/22; A01K 79/045; A23L 5/42; D06P 3/32
See application file for complete search history.

(56) References Cited

U.S. PATENT DOCUMENTS

| | | | |
|---|---|---|---|
| 4,202,905 A | | 5/1980 | Asai et al. |
| 4,728,514 A | * | 3/1988 | Lechnir ................ A01K 97/045 426/1 |
| 6,048,554 A | * | 4/2000 | Collins .................. A23K 50/80 426/1 |
| 6,748,693 B1 | | 6/2004 | Snyder et al. |
| 2006/0121166 A1 | | 6/2006 | Jeckle |

OTHER PUBLICATIONS

"Vicious—Bait Dye", https://getvicious.com/collections/bait-dye, Vicious, (3 pages), retrieved on Jun. 28, 2018.

* cited by examiner

*Primary Examiner* — Eisa B Elhilo
(74) *Attorney, Agent, or Firm* — Stoel Rives LLP

(57) ABSTRACT

A nontoxic liquid dye formulation for color staining the skin of live angling bait species comprises a dye substance suitable for application, and thereby for imparting color, to skin of angling bait species. The dye substance has a pH of between about 5.8 and about 8.2 and has a dye molecular structure carrying a net charge of no more than two negative charges or a net charge of no more than one positive charge. A dye carrier for the dye substance includes a water-soluble polyether compound mixed in an aqueous solution. The polyether compound has a weight average molecular weight of between about 2,000 and about 6,000 to function as a phase transfer agent that promotes partitioning of components of the dye substance into the skin of the bait species. The water soluble dye remains in the skin of the bait species, even though it is in an oily environment.

24 Claims, No Drawings

DYE COLOR STAINING THE EXTERIOR OF LIVE ANGLING BAIT SPECIES

COPYRIGHT NOTICE

© 2018 Pautzke Bait Co., Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

This disclosure relates generally to preparation of angling bait and, in particular, to nontoxic dye color staining of the exterior of live angling bait species.

SUMMARY OF THE DISCLOSURE

A nontoxic dye formulation in liquid form for color staining the skin of angling bait species comprises a dye substance suitable for application, and thereby for imparting color, to skin of angling bait species. The dye substance in the dye formulation has a pH of between about 5.8 and about 8.2 and has a dye molecular structure carrying a net charge of no more than two negative charges or a net charge of no more than one positive charge. A dye carrier for the dye substance includes a water-soluble polyether compound mixed in an aqueous solution. The polyether compound has a weight average molecular weight of between about 2,000 and about 6,000 to function as a phase transfer agent that promotes partitioning of components of the dye substance into the skin of the angling bait species.

A method of color staining the skin of live angling bait maintains the long-term viability of the bait skin, even though it is in an oily environment. The method entails obtaining in liquid form a dye formulation including a dye substance mixed in an aqueous carrier solution containing a polyether compound. The dye substance in the dye formulation has a pH of between about 5.8 and 8.2 and has a dye molecular structure carrying a net charge of no more than two negative charges or a net charge of no more than one positive charge. The polyether compound has a weight average molecular weight of between about 2,000 and about 6,000 to function as a phase transfer agent that promotes partitioning of components of the dye substance into skin of live angling bait to which the dye formulation is applied. The polyether compound thereby promotes rapid color staining of the skin without coating it so quickly that the live angling bait would suffocate. The dye formulation is applied in liquid form to live angling bait to color stain its skin while maintaining its viability.

Additional aspects and advantages will be apparent from the following detailed description of preferred embodiments.

DETAILED DESCRIPTION OF PREFERRED EMBODIMENTS

The disclosed preferred nontoxic dye formulations in liquid form for color staining the exterior of live angling bait employ a dye carrier including a water-soluble polymer, such as a polyether compound, mixed in an aqueous solution. A preferred polyether compound is polyethylene glycol (PEG), which functions as a phase transfer agent to promote the partitioning of the dye components into the skin of fish or other live bait species. A polymer compound such as PEG encapsulates the dye molecules and thereby shortens by a factor of two to four the time needed to color stain the exterior of live bait, as compared to that needed for dye formulations without a water-soluble polymer compound.

Neutral water-soluble polymers work well for color staining live bait. In the case of PEG, weight average molecular weights of the polymer ranging from 2,000 to 6,000 are preferred. PEGs having weight average molecular weights of about 4,000 (i.e., PEG 4000) are especially preferred because they color stain the live bait in the shortest amount of time. The likely reason is that the lower molecular weight PEG exhibits an ability to encapsulate the dye molecules in micellular structures and facilitates the partitioning of the dye into the oily environment of the live bait skin.

A variety of dye substances can be employed in the disclosed dye formulation for live bait species and include, for example, acid red 14, direct red 23, direct red 80, direct blue 86, methylene blue, acid yellow 23, soracid green, soracid blue, and rhodamine b. The dye substances can be in either liquid or particulate form. In general, any dye that is stable in water solutions at a pH range of 5.8-8.2 can be used. The disclosed dye formulations for live bait are considered neutral, having a pH in the 5.8-8.2 range.

Molecular structures of dyes used in the disclosed dye formulations for color staining live bait include functional groups carrying one or two negative charges or no more than one positive charge. Zwitterionic dye molecules, which are molecules that each contain at least one negative charge and at least one positive charge and exhibit a net zero charge, may be employed, but the net charge on the entire dye molecular structure is not more than two negative charges or not more than one positive charge. Typically, more than two negatively charged functional groups on the dye result in poor color staining of the live bait. The likely reason for poor color staining of live bait resulting from dyes that include functional groups carrying more than two negative charges is coulombic repulsion between negatively charged proteins in the live bait skin and the dye molecule. Dye molecules including functional groups carrying positive charges in the neutral pH range, such as methylene blue, work well for color staining the live bait. Dye molecules with more than one positive charge typically exist only at low pH (i.e., very acidic solutions), and the low pH is toxic to fish. Molecules with multiple positive charges coat the skin of the live bait species too quickly, and in the case of fish, can lead to rapid suffocation. Cationic polyelectrolyte polymers such as poly diallydimethylammonium chloride (PDADMAC) or anionic polymers such as carboxymethyl cellulose (CMC) do not work well for color staining live bait in the disclosed dye formulation.

Propylene glycol can be added to the disclosed dye formulation for live bait for certain dyes, such as acid red 14, direct red 23, direct red 80, direct blue 86, methylene blue, and acid yellow 23. Direct blue 86 is an example of a zwitterionic dye and has two negative functional groups and a copper metal center with two positive charges. The propylene glycol functioning as a secondary phase transfer agent aids in the partitioning of the dye into the skin of the live bait and can make color staining the live bait more rapid. Sodium chloride can also be added to the disclosed dye formulation for live bait to make the color staining process more rapid. Neither propylene glycol nor sodium chloride can be used with every dye specified in the different dye formulations for live bait, but a skilled person having sufficient knowledge of dye chemistry will understand which dyes would be compatible with propylene glycol or sodium chloride.

Some dyes can be used in combination to achieve a desired color or a more effective stain. Examples of such two-dye combinations include acid red 14 and direct red 23; acid red 14 and acid yellow 23; and soracid blue and soracid green.

The disclosed dye formulations color stain live bait more effectively than currently available dye formulations that do not incorporate one or both of a primary phase transfer agent (e.g., PEG) and a secondary phase transfer agent (e.g., propylene glycol). Preferred dye formulations stain live bait for the colors gold, red, blue, and chartreuse. To reduce the size of packaging for user convenience, the dye formulations are preferably prepared as a dye concentrate to which the user adds water preparatory to soaking fishing bait to color stain its skin.

A general formulation for the disclosed dye concentrate for color staining live bait is given below:

| | |
|---|---|
| Water | 71% to 92% by weight |
| Dye | 0.7% to 5.5% by weight |
| PEG | 2.0% to 3.5% by weight |
| Salt | 0.0% to 3.6% by weight |
| Propylene Glycol | 0.0% to 18.5% by weight. |

The constituents of the dye concentrate formulation are combined in accordance with the following mixing sequence. The dye is mixed in water for five minutes to form a first mixture. Propylene glycol is added to and mixed in the first mixture for another five minutes to form a second mixture. PEG is added to and mixed in the second mixture for another 10 minutes to form a third mixture. Salt is added to and mixed in the third mixture for another 10 minutes to form a finished dye concentrate.

The user dilutes the dye concentrate formulation to make it suitable to color stain fishing bait. (The terms "angling bait" and "fishing bait" are used interchangeably.) A preferred diluent is water, which can be added in an appropriate amount for a preferred short-time color stain soak of about 15 minutes-45 minutes or a preferred long-time color stain soak of about 1.5 hours to 3 hours. The following are general dye formulations using water as a diluent for short- and long-time color stain soaks of freshwater fishing bait species. These general dye formulations are also suitable for color staining salt water bait species. Descriptions of conditions under which salt water is used as a diluent follow the examples set forth below.

A general dye formulation for the short-time color stain soak is given below:

| | |
|---|---|
| Water | 89.6% to 99.5% by weight |
| Dye | 0.1% to 1.8% by weight |
| PEG | 0.4% to 1.2% by weight |
| Salt | 0.0% to 1.2% by weight |
| Propylene Glycol | 0.0% to 6.2% by weight. |

A general dye formulation for the long-time color stain soak is given below:

| | |
|---|---|
| Water | 95.5% to 99.7% by weight |
| Dye | 0.07% to 0.80% by weight |
| PEG | 0.20% to 0.50% by weight |
| Salt | 0.0% to 0.5% by weight |
| Propylene Glycol | 0.0% to 2.6% by weight. |

An alternative to the disclosed dye concentrate formulation is the disclosed dye formulation in diluted form. The following are four examples of specific dye formulations in diluted form for a short-time color stain soak and a long-time color stain soak of fishing bait in gold dye (Examples 1 and 2) and red dye (Examples 3 and 4).

Example 1

For the short-time soak gold dye formulation, 0.275 lb. of acid yellow 23 is mixed for 5 minutes in 94.38 lbs. of water. After completion of the first mixing iteration, 3.53 lbs. of propylene glycol are added to the mixture and mixed for another 5 minutes. After completion of the second mixing iteration, 0.675 lb. of PEG 4000 is added to the mixture and mixed for another 10 minutes. After completion of the third mixing iteration, 1.15 lbs. of salt are added to the mixture for a final 10 minutes. It is also possible to prepare the short-time soak formulation by diluting the concentrate of the gold dye (or any other dye formulation) with the appropriate amount of water.

Example 2

For the long-time soak gold dye formulation, 0.138 lb. of acid yellow 23 is mixed for 5 minutes in 97.19 lbs. of water. After completion of the first mixing iteration, 1.76 lbs. of propylene glycol are added to the mixture and mixed for another 5 minutes. After completion of the second mixing iteration, 0.338 lb. of PEG 4000 is added to the mixture and mixed for another 10 minutes. After completion of the third mixing iteration, 0.575 lb. of salt is added to the mixture for a final 10 minutes. It is also possible to prepare the long-time soak formulation by diluting the concentrate of the gold dye (or any other dye formulation) with the appropriate amount of water.

Example 3

For the short-time soak red dye formulation, 0.18 lb. of acid red 14 and 0.18 lb. of direct red 23 are mixed for 5 minutes in 98.08 lbs. of water. After completion of the first mixing iteration, 0.68 lb. of PEG 4000 is added to the mixture and mixed for another 10 minutes. After completion of the second mixing iteration, 0.90 lb. of salt is added to the mixture and mixed for a final 10 minutes. It is also possible to prepare the short-time soak formulation by diluting the concentrate of the red dye (or any other dye formulation) with the appropriate amount of water.

Example 4

For the long-time soak red dye formulation, 0.090 lb. of acid red 14 and 0.090 lb. of direct red 23 are mixed for 5 minutes in 99.04 lbs. of water. After completion of the first mixing iteration, 0.34 lb. of PEG 4000 is added to the mixture and mixed for another 10 minutes. After completion of the second mixing iteration, 0.45 lb. of salt is added to the mixture and mixed for a final 10 minutes. It is also possible to prepare the long-time soak formulation by diluting the concentrate of the red dye (or any other dye formulation) with the appropriate amount of water.

In the four examples presented above, following the sequential order of combining and mixing and the specified constituents facilitates faster dissolving of the PEG to solution. The mixing times given are typical and can be changed as needed.

The weight percent of the dye in the formulation is ultimately limited by the solubility of the dye in the formulation. In general, PEG with a weight average molecular weight of about 4000 works well in the formulations.

Some of the dyes used in the disclosed dye formulations fluoresce under ultraviolet or visible light and give the bait a fluorescent character. This is commonly referred to a UV enhancement in the fishing bait industry.

The following are two examples of a user diluting the above-specified general formulation for the disclosed dye concentrate contained in a 4 oz. bottle for retail sale.

Example 5

A user prepares a short-time color stain by diluting one 4-oz. bottle of the dye concentrate formulation with 12 oz. of water. This diluted dye formulation color stains live fishing bait after a typical soak time of about 15 minutes to about 45 minutes under aeration, depending on the bait species. Leaving the live bait in the short-time color stain concentration for more than 2 hours can result in death of the fishing bait because the dye formulation extensively coats the live bait body parts responsible for respiration.

Example 6

A user prepares a long-time color stain by diluting one 4-oz. bottle of the dye concentrate formulation with 32 oz. (one quart) of water. This diluted dye formulation color stains live fishing bait after a typical soak time of about 1.5 hours to about 3 hours under aeration. Some species of live bait (e.g., trout and sunfish) can survive a long-time stain soak of over 24 hours. Once color stained, some species of live bait retain the color for over 24 hours. The color staining is reversible, and eventually the color will fade if the live bait is kept out of the color staining solution a long enough time. Once removed from the color staining solution, the fishing bait species lives as long as other captive live bait species that have not been color stained.

The blue dye formulation, which has a soak time of no more than about one hour, is not suitable for use in a long-time color stain preparation. The reason is that blue dye is cationic and, when included in the dye formulation, over time crystallizes and thereby fogs the gills of and eventually suffocates the fishing bait.

Dilution of the dye concentrate formulation in water ensures the viability of the fishing bait soaking in the aqueous solution. Testing of the disclosed dye formulations yielded no fishing bait mortality when it was used in accordance with the short-time and long-time color stain preparations described above. Color staining of minnows with the disclosed dye formulations by professional fishing guides showed that >80% of the minnows survive the long-time staining process, even at 4-hour soak times (one hour longer than recommended for the long-time color stain process).

The short- and long-time color stain soak formulations can be used for dyeing freshwater bait species and salt water bait species, both of which species are listed in the table below.

TABLE

| Freshwater Bait | Salt Water Bait |
| --- | --- |
| Bluegill | Herring |
| Chub | Mud Minnow |
| Crappie | Mullet |
| Crawfish (some species) | Pinfish |
| Dace | Pogies (also known as |
| Emerald Shiner | bunker, menhaden, and |
| Fall Fish | mossbunker) |
| Fat Head | Sardine |
| Golden Shiner | Shrimp |
| Minnow | |
| Perch | |
| Salamander | |
| Shad | |
| Spottail Shiner | |
| Sucker | |
| Sucker Minnow | |
| Thread Fin Shad | |

Soak times for dye uptake by salt water species such as mullet are similar to soak times for uptake by freshwater species (15 minutes for the short-time color stain soak). Dye uptake by crustaceans such as shrimp takes longer (45 minutes to an hour for the short-time soak) than the dye uptake by fish species. Salt water species tested exhibited no mortality in the disclosed dye formulations and survived after dye formulation uptake with no adverse effects.

The disclosed dye formulations (both short- and long-time soaks) for salt water species are the same as those outlined for freshwater species, but salt water is used either entirely as the dilution water for the dye formulation or mixed with an appropriate volume of freshwater. Salt water refers to synthetically made solutions of salt and water, natural brackish waters (including surface and groundwater), and ocean water. Salt is defined as any water soluble or partly water soluble ionic compound that in the field of chemistry would be recognized as a salt.

It will be obvious to those having skill in the art that many changes may be made to the details of the above-described embodiments without departing from the underlying principles of the invention. For example, although they are formulated for color staining live bait, the disclosed dye formulations also color stain dead bait extremely well. The scope of the present invention should, therefore, be determined only by the following claims.

The invention claimed is:

1. A nontoxic dye formulation in liquid form for color staining the skin of angling bait species, comprising:
    a dye substance suitable for application and thereby for imparting color to skin of angling bait species, the dye formulation having a pH of between about 5.8 and about 8.2, and the dye substance having a molecular structure carrying a net charge of no more than two negative charges or a net charge of no more than one positive charge; and
    a dye carrier for the dye substance, the dye carrier including a water-soluble polyether compound mixed in an aqueous solution, the polyether compound having a weight average molecular weight of between about 2,000 and about 6,000 to function as a phase transfer agent that promotes partitioning of components of the dye substance into the skin of the angling bait species.

2. The nontoxic dye formulation of claim 1, in which the dye substance is included between about 0.7% and about 5.5% by weight in a concentrated form of the dye formulation such that the aqueous solution includes water in an amount no greater than about 92% by weight.

3. The nontoxic dye formulation of claim 1, in which the molecular structure of the dye substance includes a zwitterionic dye molecule.

4. The nontoxic dye formulation of claim 1, in which the polyether compound includes polyethylene glycol (PEG).

5. The nontoxic dye formulation of claim 4, in which the PEG is included between about 2.0% and about 3.5% by weight in a concentrated form of the dye formulation such that the aqueous solution includes water in an amount no greater than about 92% by weight.

6. The nontoxic dye formulation of claim 1, in which the aqueous solution includes water in an amount between about 71% and about 92% by weight in a concentrated form of the dye formulation.

7. The nontoxic dye formulation of claim 1, further comprising propylene glycol in an amount no greater than about 18.5% by weight in a concentrated form of the dye formulation such that the aqueous solution includes water in an amount no greater than about 92% by weight.

8. The nontoxic dye formulation of claim 1, further comprising salt in an amount no greater than about 3.6% by weight in a concentrated form of the dye formulation such that the aqueous solution includes water in an amount no greater than about 92% by weight.

9. The nontoxic dye formulation of claim 1, in which the aqueous solution includes water in an amount between about 89.6% and about 99.7% by weight and the dye substance is included between about 0.07% and about 1.8% by weight in a diluted form of the dye formulation.

10. The nontoxic dye formulation of claim 1, in which the aqueous solution includes water in an amount between about 89.6% and about 99.7% by weight, and in which the polyether compound includes polyethylene glycol (PEG) in an amount between about 0.2% and about 1.2% by weight in a diluted form of the dye formulation.

11. The nontoxic dye formulation of claim 1, in which the aqueous solution includes water in an amount between about 89.6% and about 99.7% by weight, and further comprising propylene glycol in an amount no greater than about 6.2% by weight in a diluted form of the dye formulation.

12. The nontoxic dye formulation of claim 1, in which the aqueous solution includes water in an amount between about 89.6% and about 99.7% by weight, and further comprising salt in an amount no greater than about 1.2% by weight in a diluted form of the dye formulation.

13. A method of color staining the skin of live angling bait while maintaining its long-term viability, the bait skin being present in an oily environment, comprising:
obtaining in liquid form a dye formulation including a dye substance mixed in an aqueous carrier solution containing a polyether compound, the dye formulation having a pH of between about 5.8 and 8.2, and the dye substance having a molecular structure carrying a net charge of no more than two negative charges or a net charge of no more than one positive charge, and the polyether compound having a weight average molecular weight of between about 2,000 and about 6,000 to function as a phase transfer agent that promotes partitioning of components of the dye substance into skin of live angling bait to which the dye formulation is applied and thereby promote rapid color staining of the skin without coating it so quickly that the live angling bait would suffocate; and
applying the dye formulation in liquid form to live angling bait to color stain its skin.

14. The method of claim 13, in which the live angling bait includes bluegill, chub, crappie, crawfish, dace, emerald shiner, fall fish, fat head, golden shiner, minnow, perch, salamander, shad, spottail shiner, sucker, sucker minnow, or thread fin shad as freshwater bait; or herring, mud minnow, mullet, pinfish, menhaden, sardine, or shrimp as salt water bait.

15. The method of claim 13, in which the applying the dye formulation in liquid form to the live angling bait includes soaking the live angling bait for about 15 minutes to about 45 minutes.

16. The method of claim 13, in which the applying the dye formulation in liquid form to the live angling bait includes soaking the live angling bait for about 1.5 hours to about 3 hours.

17. The method of claim 13, in which the dye substance is included between about 0.07% and about 1.8% by weight in the dye formulation.

18. The method of claim 13, in which the molecular structure of the dye substance includes a zwitterionic dye molecule.

19. The method of claim 13, in which the polyether compound includes polyethylene glycol (PEG).

20. The method of claim 19, in which the polyethylene glycol £PEGS is included between about 0.2% and about 1.2% by weight in the dye formulation.

21. The method of claim 13, in which the aqueous solution includes water in an amount between about 89.6% and about 99.7% by weight in the dye formulation.

22. The method of claim 13, in which the dye formulation further comprises propylene glycol in an amount no greater than about 6.2% by weight.

23. The method of claim 13, in which the dye formulation further comprises salt in an amount no greater than about 1.2% by weight.

24. The method of claim 13, in which the dye substance fluoresces in response to ultraviolet or visible incident light wavelengths and thereby gives a fluorescent character to the colored stained skin of the live angling bait.

* * * * *